United States Patent [19]

Malinovsky

[11] Patent Number: 4,498,139
[45] Date of Patent: Feb. 5, 1985

[54] APPARATUS FOR DESIGNING THREE-DIMENSIONAL STRUCTURES

[75] Inventor: Evgeny J. Malinovsky, Moscow, U.S.S.R.

[73] Assignee: Moskovskoe Nauchno-Proizvodstvennoe Objedinenie Po Stroitelnomu I Dorozhnomu Mashinostroeniju, Moscow, U.S.S.R.

[21] Appl. No.: 309,938

[22] Filed: Oct. 9, 1981

[51] Int. Cl.³ .................... G06B 15/46; G06F 15/56
[52] U.S. Cl. .................................................. 364/518
[58] Field of Search .............. 364/512, 474, 518, 520, 364/200, 900

[56] References Cited

U.S. PATENT DOCUMENTS

| | | | |
|---|---|---|---|
| 3,867,616 | 2/1975 | Korelitz et al. | 364/512 |
| 4,181,954 | 1/1980 | Rosenthal et al. | 364/512 |
| 4,275,449 | 6/1981 | Aish | 364/512 |
| 4,300,198 | 11/1981 | Davini | 364/513 |
| 4,346,445 | 8/1982 | Leuenberger et al. | 364/520 |

FOREIGN PATENT DOCUMENTS 1187378  6/1967  United Kingdom ............... 364/474

OTHER PUBLICATIONS

J.A. Brewer et al., *(A Graphic Man-Computer Environment for Three-Dimensional Engineering Design)*, Journal of Mechanical Design, Vol. 102, July 1980.
"A Graphic Man-Computer Environment for Three Dimensional Engineering Design," by J. A. Brewer, Transactions of the ASME, Jul. 1980, vol. 102, pp. 532–539.

*Primary Examiner*—Thomas M. Heckler
*Assistant Examiner*—Daniel K. Dorsey
*Attorney, Agent, or Firm*—Lilling & Greenspan

[57] ABSTRACT

An apparatus for designing three-dimensional structures comprises a unit for recording linear coordinates having a movable support and guideways, crosspiece, carriage and vertical rod which are coupled to one another and which cause displacement along linear coordinates. Sensors of displacement along linear coordinates X, Y, Z are coupled to the guideways, crosspiece, carriage and vertical rod for causing displacement. The apparatus also has an angle joint having three series-connected angle arms for rotation with respect to X, Y, Z axes, respectively. Sensors for recording a change in an angular coordinate $\phi$, $\phi_1$, $\phi_2$, respectively, of rotation with respect to X, Y, Z axes, respectively, are coupled to the angle arms, the point of intersection of X, Y, Z axes of entered coordinates of the movable support coinciding with a point of intersection of X, Y, Z axes of the angle arms for rotation with respect to X, Y, Z axes, respectively.

9 Claims, 8 Drawing Figures

APPARATUS FOR DESIGNING THREE-DIMENSIONAL STRUCTURES

FIELD OF THE INVENTION

The present invention relates to peripheral equipment for electronic computers, and more particularly, to an apparatus for designing three-dimensional structures.

The invention may be advantageously used for designing three-dimensional structures in various fields of mechanical engineering and primarily for designing welded steel structures of an intricate configuration (such as undercarriage frames in transportation engineering, beds of machine tools, ship framing members, booms, buckets, blades of construction machinery, etc.).

BACKGROUND OF THE INVENTION

In view of a continuing sophistication and increase in the volume of design documentation, the problem of automation of a designer's work and simplification of a conversational communication of a designer with a computer has recently become very important, especially in performing technical and working design operations.

Known in the art is an apparatus for designing three-dimensional structures (cf. Journal of Mechanical Design, vol. 102, (July, 1980, New-York, USA), J. A. Brewer, D. C. Anderson, A Graphic Man-Computer Environment for Three-Dimensional Engineering Design, vol. 532), comprising a unit for recording linear coordinates, a sensor of displacement along a linear coordinate X and a sensor of displacement along a linear coordinate Y, each sensor being mechanically coupled to the unit for recording linear coordinates and to a control board, and a unit for recording angular coordinates which is electrically coupled to the control board.

However, in this apparatus data on all coordinates are put in by different manipulations performed by both hands of an operator simultaneously, thus, making the work difficult and lowering the labour productivity.

SUMMARY OF THE INVENTION

It is an object of the invention to provide an apparatus for designing three-dimensional structures which enables an improvement of labour productivity of a designer-operator.

In addition, it is an object of the invention to improve labour conditions for a designer-operator.

This is accomplished by an apparatus for designing three-dimensional structures, comprising a unit for recording linear coordinates, a sensor of displacement along a linear coordinate X, and a sensor of displacement along a linear coordinate Y, each sensor being mechanically coupled to the unit for recording linear coordinates and connected to a control board, and a unit for recording angular coordinates which is electrically coupled to the control board. According to the invention, the unit for recording linear coordinates comprises a movable support and a means for causing displacement along linear coordinates which are mechanically coupled to one another, and the unit for recording angular coordinates comprises an angular joint having an angle arm for causing rotation with respect to the X axis, which is coupled to the movable support of the unit for recording linear coordinates, an angle arm for causing rotation with respect to the Y axis, and an angle arm for causing rotation with respect to the Z axis, said arms being electrically coupled to the control board and connected in series to one another. The apparatus also comprises the following devices electrically coupled to the control board: a sensor of displacement along the linear coordinate Z which, together with the sensor of displacement along the linear coordinate X and the sensor of displacement along the linear coordinate Y, is connected to said means for causing displacement along linear coordinates of the unit for recording linear coordinates, a sensor for recording a change in an angular coordinate $\phi$ of rotation with respect to the X axis which is installed on a movable support and mechanically coupled to the angle arm for causing rotation with respect to the X axis, a sensor for recording a change in an angular coordinate $\phi_1$ of rotation with respect to the Y axis which is mounted on the angle arm for causing rotation with respect to the X axis and mechanically coupled to the angle arm for causing rotation with respect to the Y axis, and a sensor for recording a change in an angular coordinate $\phi_2$ of rotation with respect to the Z axis which is installed on the angle arm for causing rotation with respect to the Y axis and mechanically coupled to the angle arm for rotation with respect to the Z axis. The point of intersection of the axes X, Y, Z of entered coordinates of the movable support coincides with the point of intersection of axes X, Y, Z of the angle arm for causing rotation with respect to the X axis, angle arm for causing rotation with respect to the Y axis, and angle arm for causing rotation with respect to the Z axis, respectively.

The means for causing displacement along linear coordinates preferably comprises a vertical rod rigidly connected to the movable support, a crosspiece having a carriage movable therealong through which extends a vertical rod, and guideways secured to a frame, the crosspiece moving along the guideways, the vertical rod and the carriage being mechanically coupled to the sensor of displacement along the linear coordinate Z, the carriage and the crosspiece being mechanically coupled to the sensor of displacement along the linear coordinate Y, and the crosspiece being mechanically coupled to the sensor of displacement along the linear coordinate X.

The apparatus preferably comprises a plate for visualizing the entered coordinates of a plane defining the surface of a three-dimensional structure being designed which is installed on the angle arm for causing rotation with respect to the Z axis in such manner that the point of intersection of axes X, Y, Z of entered coordinates of the movable support of the unit for recording linear coordinates should be located on the working surface of the plate.

The apparatus preferably comprises a handle which is mechanically coupled to the plate for visualizing the entered coordinates of a plane defining the surface of a three-dimensional structure being designed.

The apparatus preferably comprises the following devices connected to the means for causing displacement along linear coordinates: an actuating mechanism for causing displacement along the linear coordinate X, an actuating mechanism for causing displacement along the linear coordinate Y, an actuating mechanism for causing displacement along the linear coordinate Z which is electrically coupled to the sensor of displacement along the linear coordinate X, sensor of displacement along the linear coordinate Y, sensor of displacement along the linear coordinate Z, respectively, an actuating mechanism for causing rotation in accordance with the angular coordinate $\phi$ which is mechanically coupled to the angle arm for causing rotation with respect to the X axis and electrically coupled to the sensor for recording a change in the angular coordinate $\phi$ of rotation with respect to the X axis, an actuating mechanism for causing rotation in accordance with the angular coordinate $\phi_1$ which is mechanically coupled to the angle arm for causing rotation with respect to the Y axis and electrically coupled to the sensor for recording a change in the angular coordinate $\phi_1$ with respect to the Y axis, and an actuating mechanism for causing rotation in accordance with the angular coordinate $\phi_2$ which is mechanically coupled to the angle arm for causing rotation with respect to the Z axis and electrically coupled to the sensor for recording a change in the angular coordinate $\phi_2$ of rotation with respect to the Z axis. The inputs of all actuating mechanisms are the inputs of the apparatus.

The actuating mechanism for causing displacement along the linear coordinate X, the actuating mechanism for causing displacement along the linear coordinate Y, and the actuating mechanism for causing displacement along the linear coordinate Z are preferably mechanically coupled to the crosspiece, carriage and rod, respectively, of the means for causing displacement along linear coordinate.

The apparatus also preferably comprises a control unit which is mechanically coupled to the handle and electrically coupled to each actuating mechanism.

The control unit is preferably made in the form of a set of pushbuttons in a number corresponding to the number of associated actuating mechanisms and are installed on the handle.

The invention makes it possible to enter data on all coordinates by uniform manipulations performed by one hand with simultaneous control of the input of data by the other hand of the operator, thus, facilitating operation and improving labour productivity.

Furthermore, the invention makes it possible to visualize the data on surfaces of a three-dimensional structure being designed which have been entered so as to lower the probability of errors and improve labour productivity.

BRIEF DESCRIPTION OF THE DRAWINGS

Other objects and advantages of the invention will become apparent from the following description of specific embodiments illustrated in the accompanying drawings, in which:

FIGS. 8 $a,b,c,d,e,f,g,h,i,j,k,l,m,n,p$ show the sequence of operations in designing a mounting bracket by means of the apparatus for designing three-dimensional structures according to the invention, shown in FIG. 4.

DETAILED DESCRIPTION OF THE INVENTION

The invention is an apparatus for designing three-dimensional structures comprising a frame 1 (FIG. 1) to which is secured a table 2 with a control board 3. Guideways 4, 5 are secured to the frame 1 and a crosspiece 6 is installed on the guideways for movement along the coordinate X. A carriage 7 is installed on the crosspiece 6 for movement along the coordinate Y. A vertical rod 8 rigidly secured to a movable support 9 extends through a hole of the carriage 7, along the coordinate Z. The guideways 4, 5, crosspiece 6, carriage 7 and vertical rod 8 form a means 10 for causing displacement along linear coordinates. The movable support 9 and means 10 form a unit 11 for recording linear coordinates. The apparatus also comprises a unit 12 for recording angular coordinates (the unit is made in the form of an angle joint 12). The joint 12 (FIGS. 1, 2) comprises an angle arm 13 for causing rotation with respect to the axis X which is connected to the support 9 by means of a shaft 14. A spring 15 is provided between the support 9 and the arm 13 on the shaft 14 to compensate for the weight of the arm 13. A shaft 16 connects an angle arm 17 for causing rotation with respect to the axis Y to arm 13. Attached to the arm 17 by means of a shaft 18 is an angle arm 19 for causing rotation with respect to the axis Z.

Figure 1:
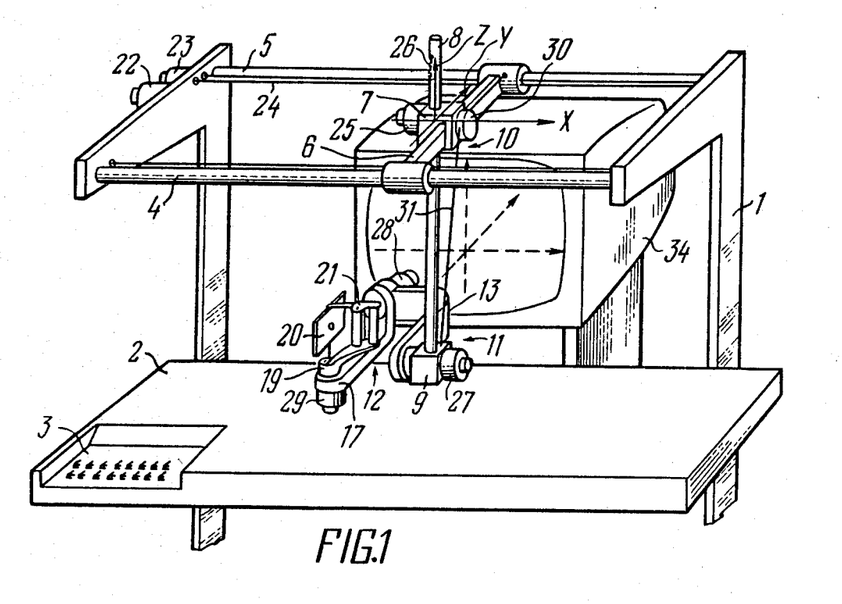
FIG. 1 is perspective view of an apparatus for designing three-dimensional structures according to the invention.
Figure 2:
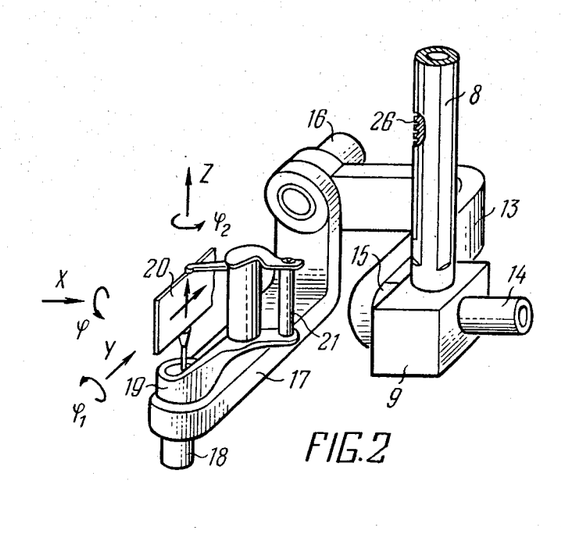
FIG. 2 is a perspective view of an angle joint according to the invention.

The point of intersection of the axes X, Y, Z of entered coordinates of the movable support 9 coincides with the point of intersection of axes X, Y, Z of the arms 13, 17, 19, respectively. A plate 20 is provided on the arm 19 for visualization of entered coordinates of a plane defining the surface of a three-dimensional structure being designed in such a manner that the point of intersection of axes X, Y, Z of the movable support 9 of the unit 11 for recording linear coordinates is on the working surface of the plate. A handle 21 is secured to the plate 20 and arm 19.

A sensor 22 of displacement along the linear coordinate X and a sensor 23 of displacement along the linear coordinate Y are secured to the frame 1 and are connected by means of a known per se cable system 24 to the crosspiece 6 and carriage 7. A sensor 25 of displacement along the linear coordinate Z is installed on the carriage 7 and is connected to the rod 8 by means of a tooth rack 26 provided on the rod. A sensor 27 for recording a change in the angular coordinate $\phi$ of rotation with respect to the X axis is installed on the shaft 14 of the arm 13 in series with the support 9. A sensor 28 for recording a change in the angular coordinate $\phi_1$ of rotation with respect to the Y axis is installed on the shaft 16 of the arm 17 in series with the arm 13. A sensor 29 for recording a change in the angular coordinate $\phi_2$ of rotation with respect to the Z axis is installed on the shaft 18 of the arm 19 in series with the arm 17. To compensate for the weight of the weight of the joint 12, sensors 27, 28, 29, and rod 8, the apparatus comprises a precompressed spring 30 secured to the carriage 7 and a cable 31 coupled thereto which is secured to the support 9. The control board (FIGS. 1, 3) is coupled, via a computer 32, to a graphical display 34 installed in front of an operator 33. One foot of the operator 33 is on a pedal 35. A plotter 36 is coupled to the computer 32 for producing a drawing of a designed three-dimensional structure.

Figure 4:
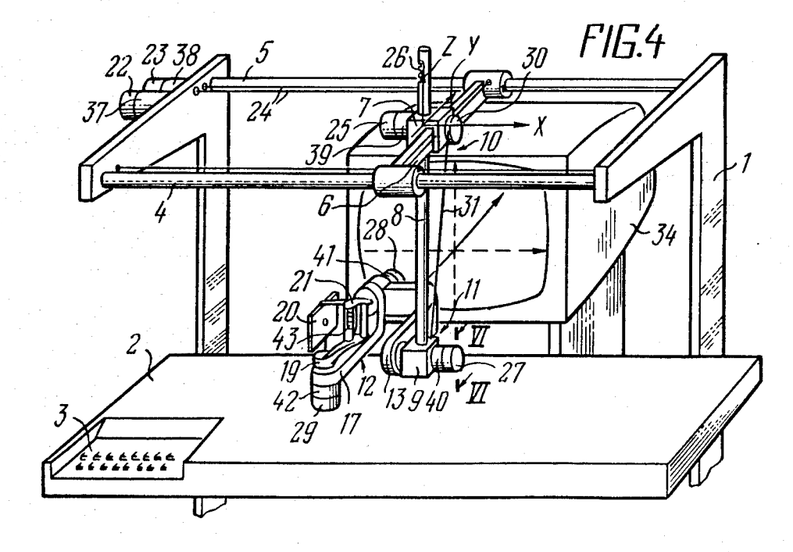
FIG. 4 is a perspective view of the apparatus for designing three-dimensional structures shown in FIG. 1, with an actuating mechanism according to the invention.
Figure 5:
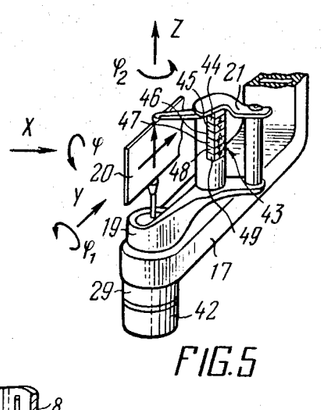
FIG. 5 is a perspective view of a handle with a control unit according to the invention.

In another embodiment, the apparatus for designing three-dimensional structures comprises an actuating mechanism 37 (FIG. 4) for causing displacement along the linear coordinate X which is mechanically coupled to the sensor 22 and, via the system 24, to the crosspiece 6; an actuating mechanism 38 for causing displacement along the linear coordinate Y which is mechanically coupled to the sensor 23, and, via the system 24, to the carriage 7; an actuating mechanism 39 for causing displacement along the linear coordinate Z which is mechanically coupled to the sensor 25 and, via a tooth rack 26, to the rod 8; an actuating mechanism 40 for causing rotation in accordance with the angular coordinate $\phi$ which is mechanically coupled to the sensor 27 and to the arm 13; an actuating mechanism 41 for causing rotation is accordance with the angular coordinate $\phi_1$ which is mechanically coupled to the sensor 28 and to the arm 17, and an actuating mechanism 42 for causing rotation in accordance with the angular coordinate $\phi_2$ which is coupled to the sensor 29 and to the arm 19. A control unit 43 is installed on the handle 21 (FIGS. 4, 5) and comprises a set of pushbuttons 44, 45, 46, 47, 48, 49 the number of which is equal to the number of the mechanisms 37, 38, 39, 40, 41, 42, which are electrically coupled to the pushbuttons.

Figure 3:
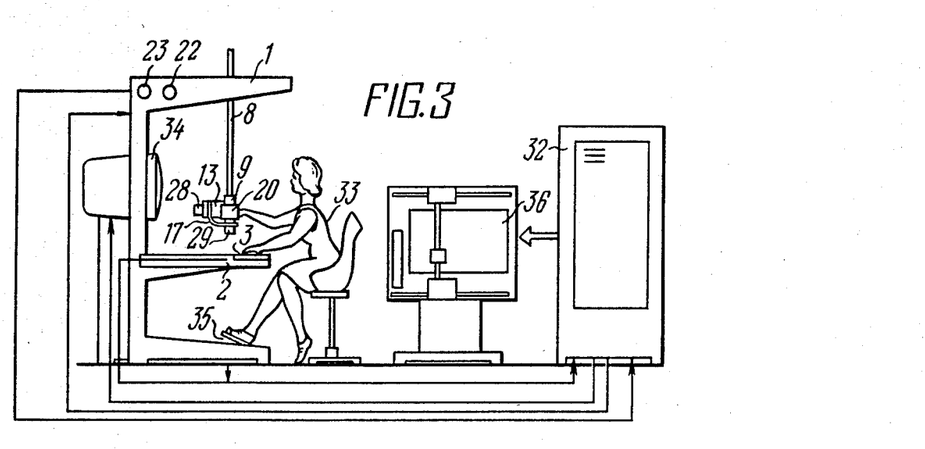
FIG. 3 is a side view of an apparatus for designing three-dimensional structures in combination with a computer.
Figure 6:
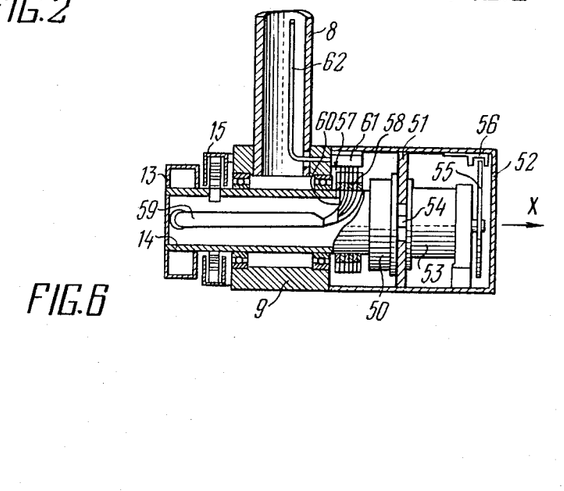
FIG. 6 is a sectional view taken along the line VI—VI in FIG. 4, according to the invention.

The actuating mechanism 40 for rotation in accordance with the angular coordinate $\phi$ (which is of a known per se type and which is identical to the mechanisms 37, 38, 39, 41, 42) comprises a reduction gearing 50 (FIGS. 4, 6) installed on a support flange and connected to the shaft 14. The flange 51 is secured to a cover plate 52 which is rigidly secured to the support 9. Attached to the flange 51 is an electric motor 53 having a shaft 54 which extends through a hole of the flange 51 and is connected to the reduction gearing 50. The sensor 27 for recording a change in the angular coordinate $\phi$ of rotation with respect to the X axis (which is of a known per se type and which is identical to the sensors 22, 23, 25, 28, 29) comprises a notched disc 55 mounted on the shaft 54 and a photodiode 56 optically coupled to the disc. For electrically coupling the unit 43 and the sensors 28 and 29 to the computer 32 (FIG. 3), the apparatus is provided with a current collector 57 (FIG. 6) having movable contacts 58 to which is connected a cord 50 of bunched conductors 60. To fixed contact 61 of the current collector 57 is connected a cord 62 of bunched conductors 60 which are coupled to the computer 32 (FIG. 3).

The control board 3 (FIGS. 1, 3, 7) comprises a panel 63 for recording actual and entered coordinates, a panel 64 for entering an arbitrary number, a panel 65 for entering a scale of a designed three-dimensional structure, a panel 66 for forming elements of the surface of the designed three-dimensional structure, a panel 67 for forming surfaces of the designed three-dimensional structure, a panel 68 for three-dimensional transformations of the designed three-dimensional structure and a panel 69 for performing additional transformations. The panel 63 comprises digital indicators 70 for recording the actual position of the plate, indicators 71 for pre-setting entered coordinates, and pushbuttons 72 for selection of coordinates. The panel 64 comprises a digital indicator 73 and a keyboard A. The panel 65 comprises a digital indicator 74 and a scale input pushbutton 75. The panel 66 comprises a pushbutton 76 for entering coordinates of a point, pushbuttons 77 for entering coordinates of a three-dimensional straight line in the axes X, Y, Z, a pushbutton 78 for entering coordinates of a plane, a pushbutton 79 for entering coordinates of the axis of a cylindrical surface, a pushbutton 80 for entering the radius of cylinder, and pushbuttons 81 for re-entering coordinates with a shaft $\delta$ in the axes X, Y, Z. The panel 67 comprises pushbuttons 82 for pre-setting the numbers of surfaces of a structure being formed, digital indicators 83 for visually recording pre-set numbers, a pushbutton 84 for entering intersections of straight lines and surfaces which are pre-set from the panel 66 with surfaces of the structure which are recorded on the indicators 83, a pushbutton 85 for joining the surface of the structure recorded on the indicators 83, a pushbutton 86 for feeding coordinates of the structure surfaces recorded on the indicators 83 to the actuating mechanisms 37, 38, 39, 40, 41, 42, a pushbutton 87 for removing the image of surfaces of the structure, the numbers of which are recorded on the indicators 83 from the display 34 and a pushbutton 88 for entering the image of surfaces of the structure, the numbers of which are recorded on the indicators 83 to the display 34. The panel 68 comprises pushbuttons 89 for displacing surfaces of the structure, pushbuttons 90 for rotating surfaces of the structure, pushbutton 91 for entering displacements and rotations of all surfaces of the structure and a pushbutton 92 for entering displacements and rotations of all surfaces of the structure recorded on the indicators 83. The panel 69 comprises a numerical keyboard B. Pushbuttons C are provided on the panels 64, 66 and 68 for reset of misentered data.

The following is a discussion of the operation of the apparatus for designing three-dimensional structures in the data input mode.

The operator 33 (FIG. 3) takes the handle 21 (FIGS. 1, 2 and 3) with the right hand and places the left hand over the control board 3. The operator looks after the position of the plate 20 in space for visualization of entered coordinates of a plane defining the surface of a structure being designed and causes it to move in such a manner as to match the working surface of the plate 20 with the element of the surface of a three-dimensional structure being designed. Since any movements of the right hand of the operator 33 results in relative displacements of the means 10 for causing displacement along linear coordinates and rotations of the angle arm 13 for causing rotation with respect to the X axis, angle arm 17 for causing rotation with respect to the Y axis, and angle arm 19 for causing rotation with respect to the Z axis, the notched discs 55 (FIG. 6) of the sensor 22 (FIGS. 1, 2, 3) of displacement along the linear coordinate X, sensor 23 of displacement along the linear coordinate Y, sensor 25 of displacement along the linear coordinate Z, sensor 27 for recording a change in the angular coordinate $\phi$ of rotation with respect to the X axis, sensor 28 for recording a change in the angular coordinate $\phi_1$ of rotation with respect to the Y axis, and sensor 29 for recording a change in the angular coordinates $\phi_2$ of rotation with respect to the Z axis are caused to move.

Signals produced by the sensors 22, 23, 25, 27, 28, and 29 are fed to the input of the computer 32. The computer 32 forms an output to the graphical display of a marker image 93 (shown in FIG. 6) which makes it possible for the operator 33 to observe a graphical representation of coordinates X, Y, Z, $\phi_1$ and $\phi_2$ recorded by the sensors 22, 23, 25, 27, 28, 29. When the operator 33 is certain that the chosen position of the plate 20 complies with the pre-set conditions, the operator depresses on the control board 3 one of the pushbuttons of the panel 66 (FIG. 7) for forming surfaces of the three-dimensional structure being designed. In case all six coordinates (that is X, Y, Z, $\phi$, $\phi_1$ and $\phi_2$) should be entered for forming the plane, the operator 33 (FIG. 3) depresses the pushbutton 78 (FIG. 7) for entering coordinates of the plane. In case only a part of coordinates are to be involved, one of the pushbuttons 77 for entering coordinates of a three-dimensional straight line in X, Y, Z axes or the pushbutton 76 for entering coordinates of a point should be depressed.

At the moment of forming a surface of the cylinder the operator 33 (FIG. 3) depresses, in a sequence, the pushbutton 79 (FIG. 7) for entering coordinates of the axis of a cylindrical surface and one of the pushbuttons 77. The direction of the cylinder axis is thus pre-set. Subsequently, after composing a desired number on the panel 64 by means of the keyboard A for entering arbitrary numbers, the operator 33 (FIG. 3) depresses the pushbutton 80 (FIG. 7) for entering the cylinder radius. This causes the interpretation of the composed number by the program of the computer 32 as the radius of cylindrical surface. By depressing the pushbuttons 81 for reentering coordinates with a shift by the amount of $\delta$ along X, Y, Z axes, the operator 33 (FIG. 3) repeats the formation of the earlier formed surface (plane or cylindrical surface) with the shift $\delta$ (which is pre-set on the panel 64 (FIG. 7) and controlled on the digital indicator 73 in X, Y, Z axes.

In forming the combination of surfaces of a three-dimensional structure being designed a surface is attributed to a certain combination by the operator 33 (FIG. 3) by means of the pushbuttons 82 (FIG. 7) for pre-setting the numbers of formed surfaces of the structure and the indicators 83 for visual recording of pre-set numbers. The operator depresses the pushbutton 82 to start transmission of any arbitrary number pre-set on the panel 67 on the indicator 83. Thus, any three combinations of surfaces of a structure being designed bearing three arbitrary numbers, respectively, may be entered simultaneously.

In case it is required to form a ridge or an edge of a structure being designed, the operator 33 (FIG. 3), after having performed input operations by sending commands from the panel 66 (FIG. 7), should depress the pushbutton 84 for entering an intersection of straight lines and surfaces on the panel 67 for forming surfaces of the three-dimensional structure being designed. The depression of the pushbutton 84 starts a program cycle for the intersection of a newly entered surface with all earlier entered combinations of surfaces of the structure being designed the numbers of which are stored in the indicators 83. In the case where data describing a rather intricately shaped structure are entered, the entire surface of the structure may be pre-formed in parts, each part being formed by a combination of surfaces. Subsequently these parts are united by depressing the pushbutton 85 for joining the surfaces of the structure which are recorded on the indicators 83. For starting the transmission of files describing the parts of the configuration of the structure numbered as recorded by the indicators 83 from the display 34 to the back-up memory of the computer 32, the operator 33 (FIG. 3) depresses the pushbutton 87 (FIG. 7) for removing the image of the structure surfaces. For a reversed operation, the operator depresses the pushbutton 88 for sending the surface image of the structure to the display 34.

For entering from the panel 64 a number corresponding to the desired scale, the operator 33 (FIG. 3) depresses on the panel 65 (FIG. 7) for entering the scale of the three-dimensional structure the pushbutton 75 to put in the scale and uses the digital indicator 74 for visual control.

In case it is required to perform three-dimensional transformations of a structure, the operator 33 (FIG. 3) depresses on the panel 68 of three-dimensional transformations (FIG. 7) the pushbutton 89 for displacing the surfaces of the structure, the pushbutton 90 for rotating surfaces of the structure, the pushbutton 91 for entering displacements and rotations of all the surfaces of the structure and the pushbutton 92 for entering displacements and rotations of surfaces of the structure recorded on the indicators 83. The pushbutton 89 is used by the operator (FIG. 3) for displacing parts of the configuration of the structure along X, Y, Z axes by the amount recorded on the indicator 73 (FIG. 7) and the pushbuttons 90 are used similarly for rotation of the parts of configuration of the structure with respect to X, Y, Z, axes by the amount $\phi, \phi_1, \phi_2$.

Operation of the apparatus for designing three-dimensional structures will now be described in the data input-output mode.

The operator 33 (FIG. 3) performs the input of data as described above. However, in the course of the design process it may appear necessary to put the plate 20 (FIGS. 3, 4, 5) into a position corresponding to the position of a certain one of earlier entered surfaces, that is, coordinates of a certain surface should be put out of the memory of the computer 32. In such a case, the operator chooses and depresses one of the pushbuttons 44, 45, 46, 47, 48, 49 of the control unit 43 and switches over respective actuating mechanisms 37, 38, 39, 40, 41, 42 from the braking function to the free rotation function.

In case the operator 33 wants to switch over all actuating mechanisms 37, 38, 39, 40, 41, 42 to the free rotation function, the pedal 35 should be depressed.

Moveover, if it is necessary, by depressing on the panel 67 for forming surfaces of a three-dimensional structure being designed (FIG. 7) the pushbutton 86 for entering coordinates of a combination of surfaces of the structure being designed which are numbered as recorded by the indicators 83, the operator 33 (FIG. 3) starts a special output function. This function is equivalent to a "materialization" of surfaces of the formed parts of the structure.

According to the invention, the term "materialization" means the function of the apparatus according to the invention in which the plate 20 is put by means of the actuating mechanism 37 (FIG. 4) for causing displacement along the linear coordinate X, actuating mechanism 38 for causing displacement along the linear coordinate Y, actuating mechanism 39 for causing displacement along the linear coordinate Z, actuating mechanism for causing rotation in accordance with the angular coordinate $\phi$, actuating mechanism for causing rotation in accordance with the angular coordinate $\phi_1$, and actuating mechanism 42 for causing rotation in accordance with the angular coordinate $\phi_2$, into a position in which its working surface coincides with one (nearest) surface of the designed part of the structure. At the moment of positioning of the plate 20 to coincide with such surface the actuating mechanisms 37, 38, 39, 40, 41, 42 are switched over to the braking function by a signal fed from the computer 32 (FIG. 3). The plate 20 which is thus stopped gives a sensation of an abutment to the hand of the operator 33 (FIGS. 3, 4), as though the operator 33 had encountered some solid obstacle through the plate 20 which corresponds to the part of the structure being designed.

According to the invention, this function of feeding out to the plate 20 the coordinates of the surface which has been formed earlier substantially facilitates the work of the operator 33 and improves the accuracy of operation when starting the design of every new part of the structure which has surfaces in common with certain parts designed at earlier stages.

The sequence of operations by the apparatus according to the invention in designing a mounting bracket consisting of three parts I, II, III and shown on the display screen 34 (FIGS. 3, 4, 8) will now be described in greater details.

The operator 33 depresses the pushbutton 44 to turn off the braking of the mechanism 38 and causes the plate 20 to move into a certain position along the X axis. The operator 33 can watch the position of the plate 20 also from the position of the marker 93 on the screen of the display 34. When a desired position is chosen, the operator 33 depresses with the left hand a key with the character "I" in the keyboard A of the panel 64 (FIG. 7) and one of the pushbuttons 82 on the panel 67. When the number "I" appears on one of the indicators 83, the operator is aware that all subsequent manipulations will relate to the construction of the part I of the mounting bracket. Subsequently, the operator depresses the pushbutton 78 and puts respective coordinates X, Y, Z, and $\phi$, $\phi_1$, $\phi_2$ into the memory of the computer 32 (FIG. 3). A trace 94 (shown in FIG. 8a) of the entered plane on the coordinate planes appears on the screen of the display 34. Then the operator 33 (FIG. 3) composes on the keyboard A (FIG. 7) of the panel 64 a number corresponding to a desired thickness of the part I and depresses, in a sequence, two pushbuttons 81 with signs "$\delta$" and "X" on the panel 66 and the pushbutton 78 on the panel 66 so as to put in the computer 32 (FIG. 3) a new plane with coordinates X, Y, Z and $\phi$, $\phi_1$ and $\phi_2$ shifted by $\delta$ along the axis X (or minus X, depending on the sign of $\delta$). A trace 95 (shown in FIG. 8b) of the second entered plane appears on the screen of the display 34 (FIG. 3). Subsequently the operator choses the location of dissecting planes as described above. However, after every operation of entering coordinates of the plane, the operator 33 will depress the pushbutton 84 (FIG. 7) so as to start the operation for computing lines of intersection of the entered planes, that is, respective edges 96, 97, 98, 99 (shown in figures c, d, e, f respectively) of the finally formed part I.

When the design of the next part II of the mounting bracket is to be started, the operator 33 (FIG. 7), after performance of all preparatory operations similar to those described above, puts out the coordinates of the surfaces which have been already formed. This is necessary because the parts I and II should join one another so that the plane of the lower side of the part I is at the same time the plane of the top side of the part II. In order to pre-set this common surface exactly, the operator 33 (FIG. 3) depresses the pushbutton 86 (FIG. 7) on the panel 67 and starts operation of "materialization" of the part I which is formed. By depressing the pedal 35 (FIG. 3) the operator moves the plate 20 freely (FIGS. 3, 4) to a position in which it is adjacent to a certain chosen surface of the "materialized" part I. However, after the pushbutton 86 (FIG. 7) is depressed, appropriate computing procedures in the program of the computer 32 (FIG. 3) perform computation of the distance to the nearest "materialized" surface along all coordinates on the basis of coordinates X, Y, Z and $\phi$, $\phi_1$, $\phi_2$. Difference signals are fed to the actuating mechanisms 37, 38, 39, 40, 41, 42 (FIG. 7) from the computer 32 (FIGS. 3, 4), and the actuating mechanisms cause the plate 20 to move in the directions for approximating the "materialized" surface. When each pair of the coordinates (actual and computed) are exactly identical, the computer 32 feeds signals for braking the actuating mechanisms 37, 38, 39, 40, 41, 42. The operation of sending coordinates X, Y, Z and $\phi$, $\phi_1$, $\phi_2$ from the memory of the computer 32 to the apparatus according to the invention is over, and a trace 100 (FIG. 8g) appears on the screen.

The part II is then designed in the manner similar to that for the part I, that is, the sides 101, 102, 103, 104 shown in FIGS. 8h,i,j are designed in a sequence.

Figure 7:
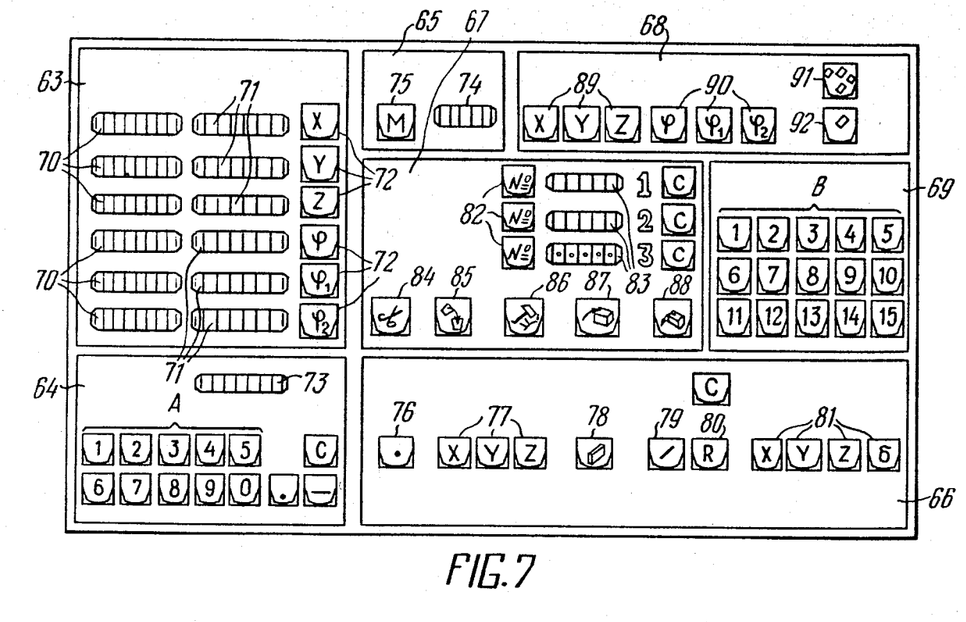
FIG. 7 is a top view of a control board according to the invention.
Figure 8:
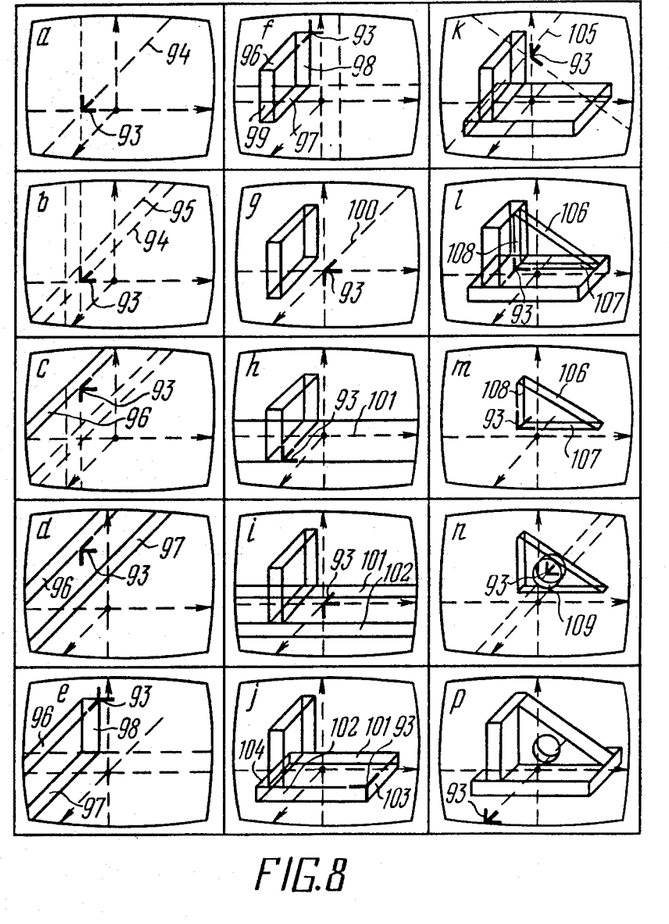

For starting the design of the part III of the mounting bracket, the operator 33 (FIG. 3) causes the "materialization" of both parts I and II formed earlier. This means that no new numerical coordinates should be entered for designing the part III. Only the coordinates entered earlier are used which substantially simplifies the process of constructing complicated structures. The design of the part III is similar to that of the parts I and II and begins with the appearance of a trace 105 (FIG. 8 k). Subsequently sides 106, 107, 108 (shown in FIGS. 8 l, m) are designed. After the part III is designed, the operator 33 (FIG. 3) unloads the screen of the display 34 (FIGS. 3, 8) by depressing the pushbutton 87 (FIG. 7) to remove the parts I and II from the screen. Subsequently, using the above-described operations, the operator cuts out a hole 109 (shown in FIG. 8 n) in the part III. The operator 33 (FIG. 3) then returns the removed parts I and II back to the screen of the display 34 by depressing the pushbuttons 88 and 85 (FIG. 7).

Thus, the design of the mounting bracket shown in FIG. 8 p is completed.

The invention makes it possible to mechanize substantially the complete work of a design engineer (operator) by liberating him from problems associated with drawing, matching and checking dimensions of adjoining elements of a structure.

Moreover, the operations performed by the design engineer do not require any special knowledge concerning the computer since he works with the computer using concepts and terms inherent in the engineering design activity.

The design process may be performed on the basis of techniques using no drawings at all since the image of a designed structure may be further transmitted directly to machine tools with numerical control for manufacturing products.

I claim:

1. An apparatus for designing three-dimensional structures, comprising:

a unit for recording linear coordinates;

a movable support of said unit for recording linear coordinates;

a means for causing displacement of said unit for recording linear coordinates along linear coordinates, said means being mechanically coupled to said movable support;

a sensor of displacement along a linear coordinate X which is coupled to said means for causing displacement along linear coordinates;

a sensor of displacement along a linear coordinate Y which is coupled to said means for causing displacement along linear coordinates;

a sensor of displacement along a linear coordinate Z which is coupled to said means for causing displacement along linear coordinates;

an angle joint which is mechanically coupled to one end of said movable part opposite to the means for causing displacement;

an angle arm for causing rotation with respect to X axis in said angle joint, said angle arm being mechanically coupled to said movable support;

an angle arm for causing rotation with respect to Y axis in said angle joint, said angle arm being mechanically coupled to said angle arm for causing rotation with respect to X axis;

an angle arm for causing rotation with respect to Z axis in said angle joint, said angle arm being mechanically coupled to said angle arm for causing rotation with respect to Y axis;

a point of intersection of said X, Y, Z axes of entered coordinates of said movable support coinciding with a point of intersection of said X, Y, Z axes of said angle arm for causing rotation with respect to X axis, said angle arm for causing rotation with respect to Y axis, and said angle arm for causing rotation with respect to Z axis, respectively;

a sensor for recording a change in an angular coordinate $\phi$ of rotation with respect to X axis which is installed on said movable support and mechanically coupled to said angle arm for causing rotation with respect to X axis;

a sensor for recording a change in an angular coordinate $\phi_1$ of rotation with respect to Y axis which is installed on said angle arm for causing rotation with respect to X axis and mechanically coupled to said angle arm for causing rotation with respect to Y axis;

a sensor for recording a change in an angular coordinate $\phi_2$ of rotation with respect to Z axis which is installed on said angle arm for causing rotation with respect to Y axis and mechanically coupled to said angle arm for causing rotation with respect to Z axis; and a control board which is electrically coupled to all said sensors and to said angle joint.

2. An apparatus according to claim 1, in which the means for causing displacement along linear coordinates comprises:

a vertical rod which is rigidly connected to said movable support and mechanically coupled to said sensor of displacement along the linear coordinate Z;

a crosspiece which is mechanically coupled to said sensor of displacement along the linear coordinate X and to said sensor of displacement along the linear coordinate Y;

a carriage movable along said crosspiece, said vertical rod extending through the carriage, the carriage being mechanically coupled to said sensor of displacement along the linear coordinate Y and to said sensor of displacement along the linear coordinate Z; and guideways secured to a frame of the apparatus, said crosspiece moving along said guideways.

3. An apparatus according to claim 1, wherein the apparatus also comprises:

a plate for visualization of entered coordinates of a plane defining a surface of a three-dimensional structure being designed, said plate having a working surface and being installed on said angle arm for causing rotation with respect to Z axis in such a manner that said point of intersection of entered coordinates X, Y, Z of said movable support of said unit for recording linear coordinates is on said working surface.

4. An apparatus according to claim 1, wherein the apparatus also comprises:

an actuating mechanism for causing displacement along the linear coordinate X which is mechanically coupled to said means for causing displacement along linear coordinates and electrically coupled to said sensor of displacement along the linear coordinate X;

an actuating mechanism for causing displacement along the linear coordinate Y which is mechanically coupled to said means for causing displacement along linear coordinates and electrically coupled to said sensor of displacement along the linear coordinate Y;

an actuating mechanism for causing displacement along the linear coordinate Z which is mechanically coupled to said means for causing displacement along linear coordinates and electrically coupled to said sensor of displacement along the linear coordinate Z;

an actuating mechanism for causing rotation in accordance with the angular coordinate $\phi$ which is mechanically coupled to said angle arm for rotation with respect to X axis and electrically coupled to said sensor for recording a change in the angular coordinate $\phi$ of rotation with respect to X axis;

an actuating mechanism for causing rotation in accordance with an angular coordinate $\phi_1$ which is mechanically coupled to said angle arm for rotation with respect to Y axis and electrically coupled to said sensor for recording a change in the angular coordinate $\phi_1$ of rotation with respect to Y axis;

an actuating mechanism for causing rotation in accordance with an angular coordinate $\phi_2$ which is mechanically coupled to said angle arm for rotation with respect to Z axis and electrically coupled to said sensor for recording a change in the angular coordinate $\phi_2$ of rotation with respect to Z axis.

5. An apparatus according to claim, wherein the apparatus also comprises a handle which is mechanically coupled to said plate for visualization of entered coordinates of a plane defining the surface of a three-dimensional structure being designed.

6. An apparatus according to claim 4, wherein the apparatus also comprises:

a plate for visualization of entered coordinates of a plane designing the surface of a three-dimensional structure being designed, said plate having a working surface and being installed on said angle arm for causing rotation with respect to Z axis in such a manner that said point of intersection of said X, Y, Z axes of entered coordinates of said movable support of said unit for recording linear coordinates is on said working surface.

7. An apparatus according to claim 6, wherein the apparatus also comprises a handle which is mechanically coupled to said plate for visualization of entered coordinates of a plane defining a surface of a three-dimensional structure being designed.

8. An apparatus according to claim 7, wherein the apparatus also comprises:
a control unit which is mechanically coupled to said handle and electrically coupled to each one of all of said actuating mechanisms.

9. An apparatus according to claim 8, wherein said control unit comprises a set of pushbuttons the number of which corresponds to the number of said actuating mechanisms coupled thereto.

* * * * *